No. 734,899. PATENTED JULY 28, 1903.
V. LAPP.
METHOD OF PRODUCING WORT.
APPLICATION FILED JUNE 26, 1901.
NO MODEL.
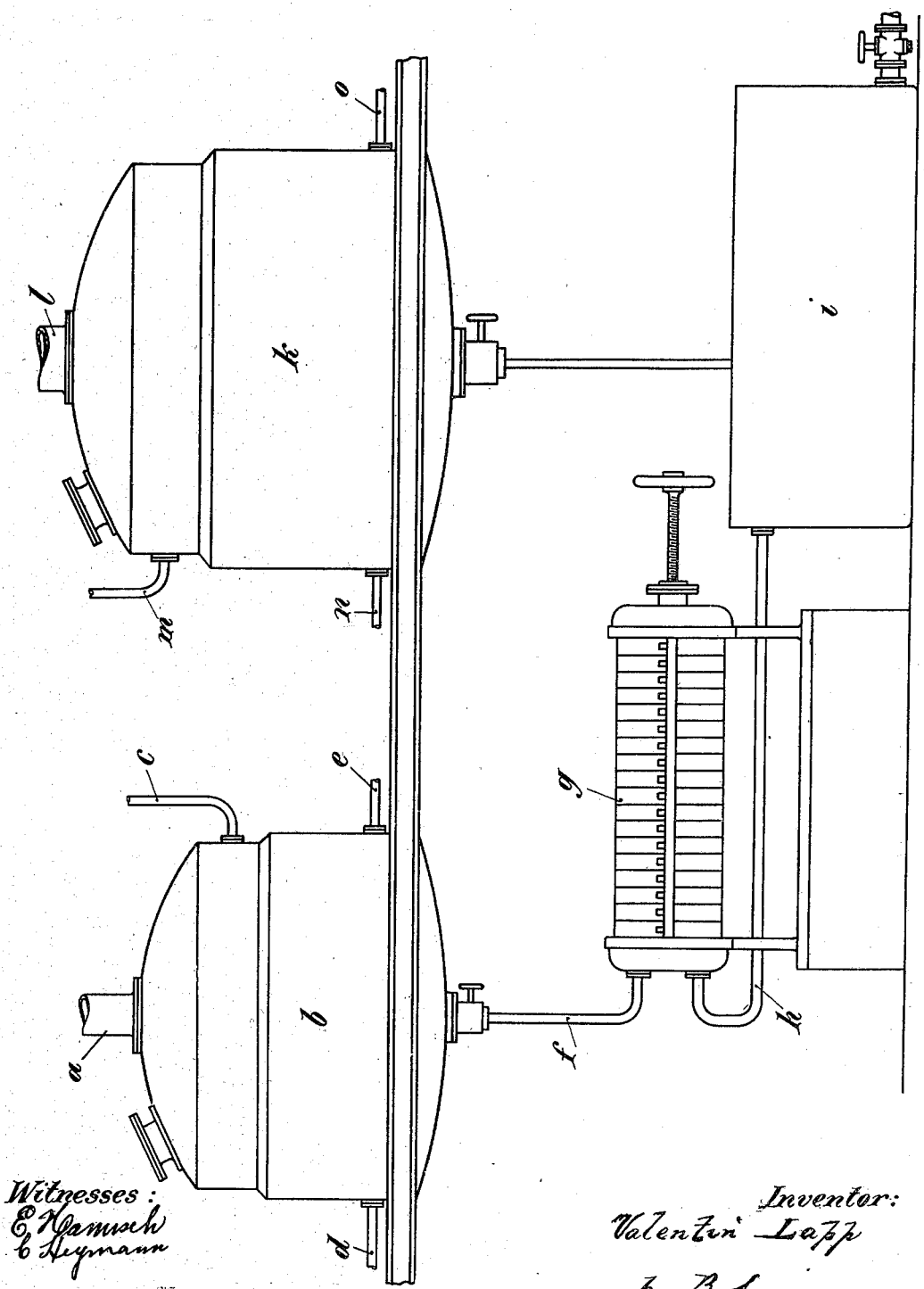
Witnesses:
E. Hamisch
E. Heymann
Inventor:
Valentin Lapp
by B. Singer
his Attorney.

No. 734,899. Patented July 28, 1903.

UNITED STATES PATENT OFFICE.

VALENTIN LAPP, OF LINDENAU, NEAR LEIPZIG, GERMANY.

METHOD OF PRODUCING WORT.

SPECIFICATION forming part of Letters Patent No. 734,899, dated July 28, 1903.

Application filed June 26, 1901. Serial No. 66,158. (No specimens.)

*To all whom it may concern:*

Be it known that I, VALENTIN LAPP, brewer, a subject of the King of Saxony, residing at Lindenau, near Leipzig, in the Kingdom of Saxony, Germany Empire, have invented a new and Improved Method of Treating the Husks of Malt in the Manufacture of Wort for Beer, of which the following is a specification.

In the manufacture of wort for beer it has heretofore been the practice to separate the malt into the contents of the grains and of the husks, and these have also been separately mashed and either the two mashes or the worts therefrom produced have then been mixed at the proper time.

The present invention relates to a particular treatment of the husks alone, irrespective as to the manner in which the contents of the grain may be treated or turned into a mash and into a wort after the meal has been ground and separated by a suitable sifting device. The husks after such separation are treated as hereinafter described, the invention consisting in the improved method or process, as particularly pointed out in the appended claims.

In the drawing, representing the apparatus used diagrammatically, $b$ designates a vat into which the husks are introduced through the pipe $a$. A suitable quantity of water having a temperature of about 50° centigrade is introduced into the vat $b$ through the pipe $c$, the water and husks remaining in the vat not longer than a period of fifty minutes, the temperature of the contents of the vat being maintained at about 50° centigrade by means of a coil located at the bottom of the vat, said coil being fed through the pipe $d$, the superfluous steam and condensation passing off at $e$. At the end of this period (from forty to fifty minutes) the mixture is passed through the pipe $f$ into the filter-press $g$, within which the mixture is separated into its solid and liquid components, the residue from the husks remaining in the press, while the wort which has been obtained from the husks is passed through pipe $h$ into the vat $i$, in which it is mixed with the wort obtained from the contents of the malt grain which has been produced in the vat $k$ in any desired manner. The vat $k$ is shown in the drawings as being substantially similar in structure to the vat $b$, the equivalent of parts $a$ $c$ $d$ $e$ being designated by $l$, $m$, $n$, and $o$.

As heretofore stated, the invention relates entirely to the treatment of the separated husks, and in such treatment the temperature provided and maintained in the vat $b$ (50° centigrade or less, 50° centigrade being the maximum) and the length of time the mixture of husks and water is retained in the vat (from forty to fifty minutes) are of primary importance.

Husks contain certain substances, some of which are of value in the manufacture of wort, while others are valueless and detrimental to the beer. The nature of these substances is unknown to me at the present time; but the detrimental effect of the valueless substances contained therein has been demonstrated by many experiments made, during which it was found that if the husks were subjected to a treatment in which the temperature and time was limited a vastly better quality of beer is obtained than if the husks are boiled for the time generally used—viz., four to five hours. A further indication of the presence of such substances in the product as now commonly made is that when passed through the filter-press a slimy deposit is quickly made on the filter-plates, thus preventing the perfect filtering of the product and extending the time of passage through the filter-press. In the process herein described such deposit on the filter-plates is not present nor is any indication thereof found. The mash can therefore be passed immediately through the filter-press, providing upon its passage therethrough the proper wort and dispensing with intermediate steps, such as are required in the known processes.

The product over that heretofore produced has been found under tests to be of better grade.

As heretofore set forth, the component substances of the husks are not known at this time, and therefore the chemical changes resulting from the action as disclosed in the present process and those heretofore used cannot be stated; but the visible indications (the absence of the slimy deposit on the filter-plates) set forth show that the limitations as to temperature and time are important factors in the process.

Having now described my invention, what I desire to secure by Letters Patent of the United States is—

1. The method of treating the husks of malt in the manufacture of wort for beer after they have been separated from the content of the grains, consisting in mashing the husks, extracting them at a temperature not exceeding 50° centigrade and during a time not exceeding fifty minutes, and separating the liquor from the solid components of the mash, as set forth.

2. The method of producing wort for beer from malt separated into the content of the grains and the husks, consisting in mashing and treating further the contents of the grains in the ordinary way, mashing the husks separately, extracting them at a temperature not exceeding 50° centigrade and during a time not exceeding fifty minutes, separating the liquor from the solid components of this mash, and adding the wort thus obtained to the wort obtained from the content of the grains, as set forth.

3. The method of producing beer-wort from malt separated into the content of the grains and the husks, and having each of these products mashed separately, consisting in extracting the husks at a temperature not exceeding 50° centigrade and during a time not exceeding fifty minutes, separating the liquor from the solid components of this mash, adding it to the liquor obtained from the mash of the content of the husks, and treating the whole further in the ordinary manner, as set forth.

In witness whereof I have hereunto set my hand in presence of two witnesses.

VALENTIN LAPP.

Witnesses:
 RUDOLPH FRICKE,
 CHAS. J. BURT.